(12) United States Patent
Boland

(10) Patent No.: US 7,513,126 B2
(45) Date of Patent: Apr. 7, 2009

(54) OUTDOOR COOLING DEVICE

(76) Inventor: David V. Boland, 342 SeeWee Cir., Mount Pleasant, SC (US) 29464

( * ) Notice: Subject to any disclaimer, the term of this patent is extended or adjusted under 35 U.S.C. 154(b) by 540 days.

(21) Appl. No.: 11/042,372

(22) Filed: Jan. 25, 2005

(65) Prior Publication Data

US 2006/0162368 A1  Jul. 27, 2006

(51) Int. Cl.
*F28D 15/00* (2006.01)
(52) U.S. Cl. ............................ 62/310; 62/261; 62/314
(58) Field of Classification Search .................. 62/310, 62/314, 331, 261
See application file for complete search history.

(56) References Cited

U.S. PATENT DOCUMENTS

| 2,727,366 | A |   | 12/1955 | Hagen |
|---|---|---|---|---|
| 3,444,799 | A | * | 5/1969 | Covington .................. 454/370 |
| 5,000,384 | A |   | 3/1991 | Arnold |
| 5,207,238 | A |   | 5/1993 | Rivera et al. |
| 5,964,233 | A | * | 10/1999 | Clark et al. .................... 135/16 |
| 5,979,793 | A |   | 11/1999 | Louis |
| 6,112,538 | A |   | 9/2000 | Strussion |
| 6,117,219 | A |   | 9/2000 | Muhr et al. |
| 6,158,669 | A |   | 12/2000 | Louis |
| 6,298,866 | B1 |  | 10/2001 | Molnar, IV |
| 6,527,257 | B1 |  | 3/2003 | Schuld |
| 6,682,000 | B1 |  | 1/2004 | Apple |

FOREIGN PATENT DOCUMENTS

DE  4329209 A1  3/1994
DE  10140188 A1  3/2003

* cited by examiner

*Primary Examiner*—Melvin Jones
(74) *Attorney, Agent, or Firm*—B. Craig Killough; Ernest B. Lipscomb, III

(57) ABSTRACT

A cooling device has a series of baffles that deflect a falling stream of liquid coolant. An air handler, such as a fan, pulls air through the liquid coolant. The air moved by the air handler through the liquid coolant is cooled, and the cooled air exits the device to cool the surrounding environs.

9 Claims, 3 Drawing Sheets

OUTDOOR COOLING DEVICE

FIELD OF THE INVENTION

This invention relates to cooling devices generally, and is more specifically related to a cooling device having particular utility for outdoor use.

BACKGROUND OF THE INVENTION

There is a need for outgoing environs more comfortable during hot weather. It is not practical to provide ordinary air conditioning for spaces that are not enclosed. It has long been known that evaporation of water will evaporate quickly and provide a cooling effect. However, nozzles that simply atomize and spray water do not sufficiently provide a cooling effect for surrounding air, and people and objects in vicinity of the device will be dampened by such a spray.

SUMMARY OF THE PRESENT INVENTION

The present invention is a cooling device having a series of baffles that deflect a falling stream of liquid coolant. An air handler, such as a fan, pulls air through the liquid coolant. The air moved by the air handler through the liquid coolant is cooled, and the cooled air exits the device to cool the surrounding environs.

DETAILED DESCRIPTION OF THE PREFERRED EMBODIMENT

Figure 1:
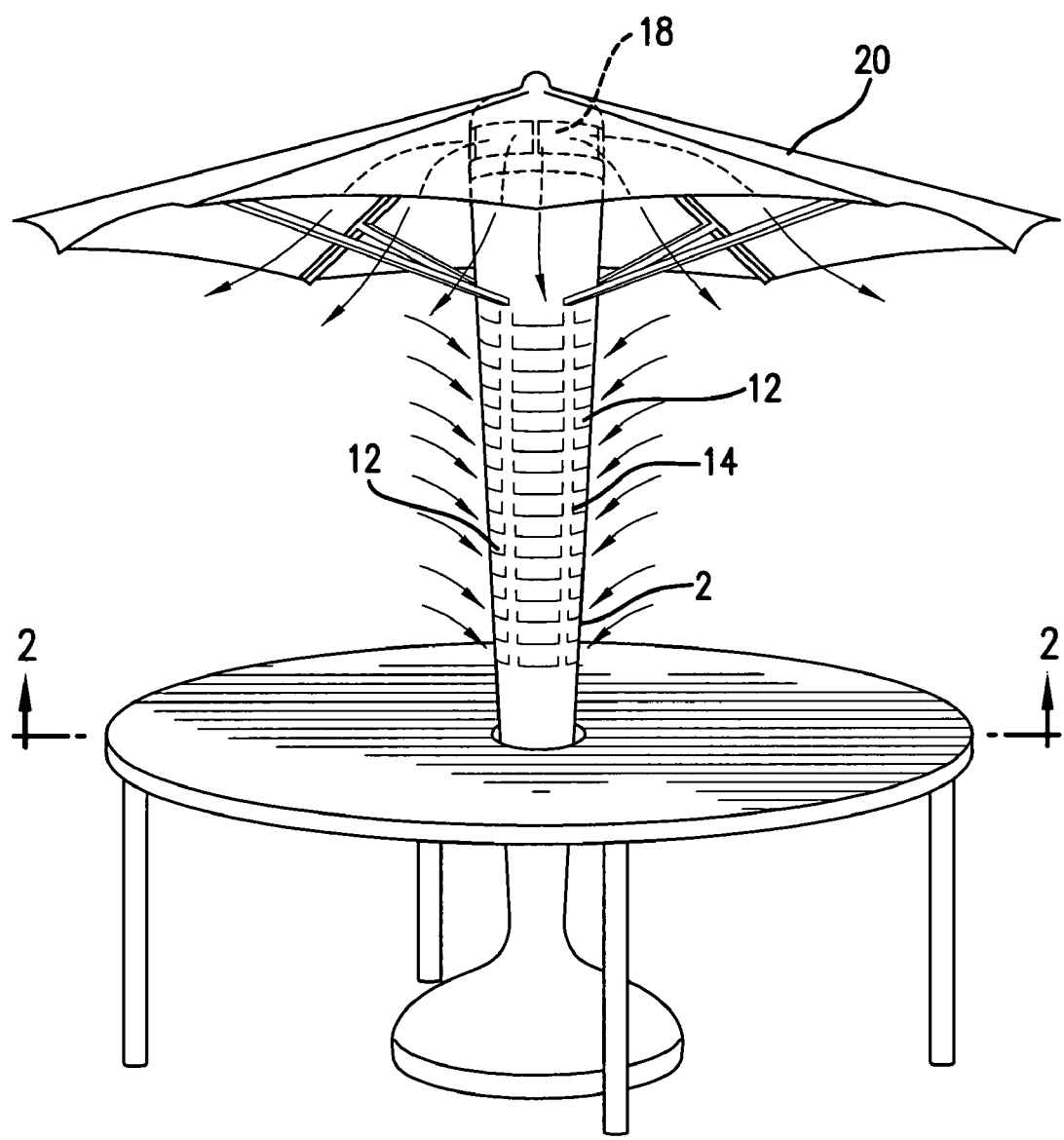
FIG. 1 is a perspective view of an embodiment of the device, with arrows indicating air flow through the device.

A preferred embodiment of the present invention takes the form of a patio table having an umbrella 2. A patio table of this type is a suggestion for a possible use of the invention, however the device is useful for cooling any area as will be seen, and is not necessary that the device have a table or umbrella affixed.

A liquid coolant 4, which may be water, is placed in the base 6 of the cooling tower, and is pumped into a tray that is part of distributor 8, located in the upper portion of the cooling tower. Water drips from multiple orifices 10 in the distributor, and onto multiple baffles 12 that are positioned around the tower, and underneath the orifices. Air inlets 14 are positioned under the baffles. As the water drips on the baffles, the water is diffused by the baffles. The fan 16 in the upper portion of the tower pulls air through the inlets, and the air passes through the water. Heat is removed from the air and transferred to the water. The air cooled by the water is delivered outside of the tower, through outlets 18 in an upper portion of the tower. The tower may have a dome, or other air directing device, such as an umbrella 20, which directs the cooled air as it exits the device.

Figure 2:
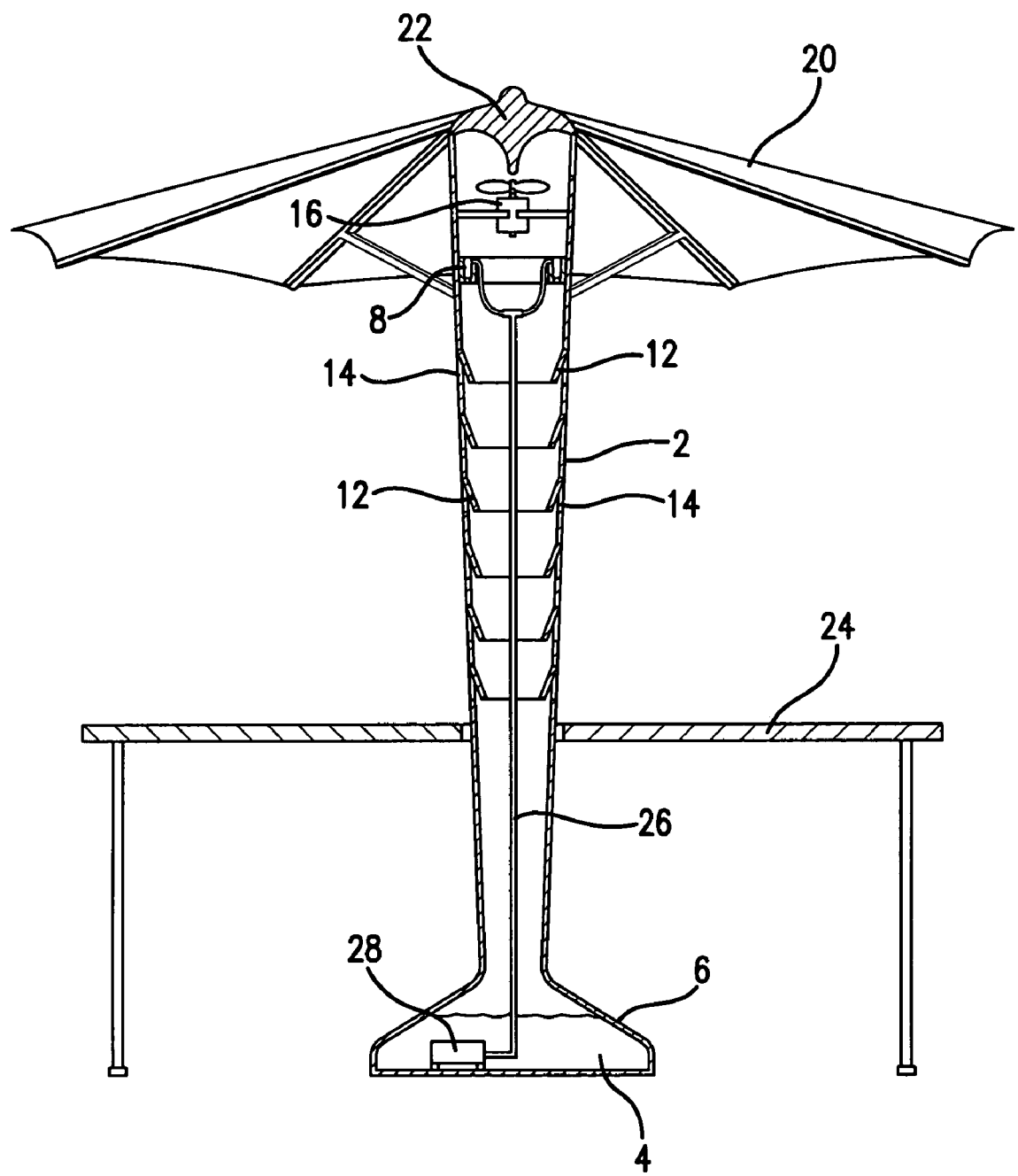
FIG. 2 is a sectioned view of an embodiment of the invention taken essentially along line 2-2 of FIG. 1.
Figure 3A:
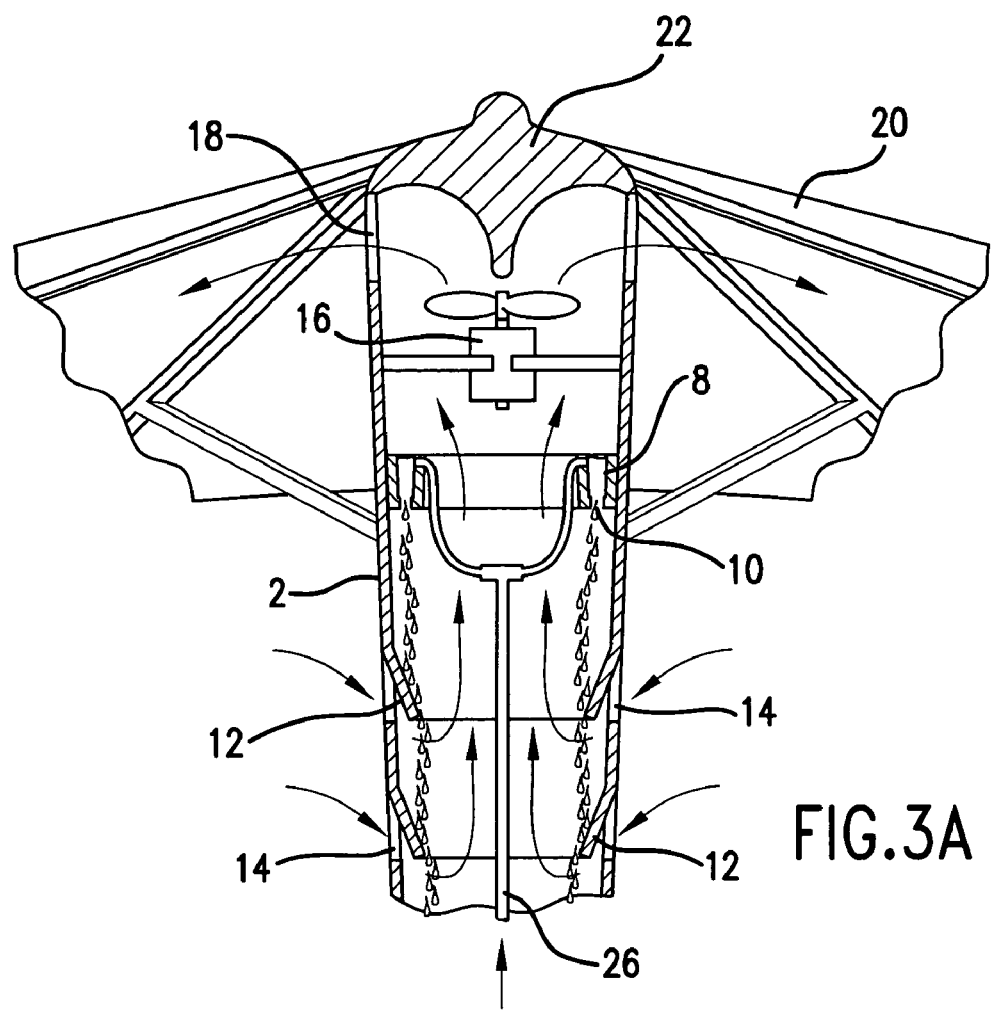
FIG. 3A is a partial view of the upper portion of the device.
Figure 3B:
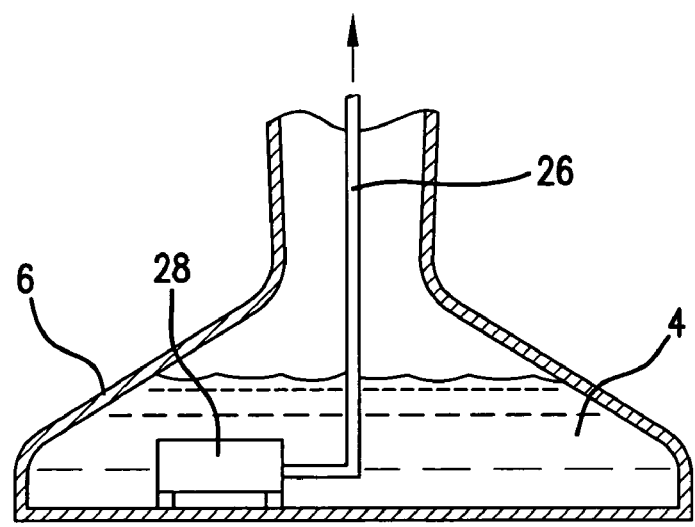
FIG. 3B is a partial view of a lower portion of the device.

Turning now to the drawing figures, FIG. 2 shows a series of baffles 12 that are positioned within a housing. The series of baffles may be positioned generally vertically, and are preferred to be increasingly closer together toward the bottom of the device. As shown in FIG. 3A, a liquid coolant is directed on to the top baffle. The liquid coolant, which is preferred to be water, but which could be other liquids, strikes the top baffle, and then drops to the next lower baffle. This process is repeated until the coolant exits the last baffle and is collected in the reservoir in the bottom of the housing.

Below each baffle is an air inlet that is formed in the housing.

As shown in FIG. 3A, air is pulled through an inlet that is effectively below the baffle. The coolant is splattered, and somewhat atomized, by striking the baffles, and the air entering the housing through the inlet is cooled by exposure to the multiple surfaces of the water created by diffusing the water by means of the baffles. The air is then pulled through the top of the housing by an air handler, where the cooled air exits the housing. A deflector 22 in the upper part of the housing, and the umbrella, direct the cool air toward the persons sitting around the table 24, and persons who are otherwise in the area of the device.

The coolant, which may be water, is pumped from the reservoir and through the center of the tower and into a liquid coolant source for the baffles. The liquid coolant source may be a distributor having a series of voids that allow the coolant to drip directly on the baffles as shown in FIG. 3A. The distributor 8 may be an annular trough that receives liquid coolant that is pumped from the reservoir and through the conduit 26 by a pump that is located in the reservoir in a lower portion of the housing. The weight of the coolant in the lower portion of the reservoir assists in stabilizing the device.

The reservoir may be either manually filled with water on a periodic basis, or may be plumbed and connected to a larger water source. A float actuated valve 28 may be used to control the level of the water within the reservoir.

The air handler pulls air through the plurality of inlets in the housing. It is preferred that at least one inlet is associated with each baffle. As shown in the drawings, the inlet is constructed to direct air below the baffle after the coolant strikes the baffle. The inlets could also be positioned above the baffles.

The air handler may be a fan. It is preferred that the fan is positioned above the baffles and below the exhaust as shown in FIG. 3A. There is a relatively large void through the center of the housing which allows for sufficient air flow. The void in the housing extends through the center of the distributor 8.

Excepting the air inlets and outlets, the device is preferred to be enclosed, so that the liquid coolant is retained within the device. For example, the water falling against the baffles is preferred to not be exposed to an exterior of the device, so that the water is retained in the interior of the housing.

The device is preferred to be portable, and capable of movement by one or two persons, so that it can be positioned as desired.

What is claimed is:

1. A cooling device, comprising:
   a) at least one baffle having an exhaust port located above said at least one baffle;
   b) at least one air inlet positioned below said at least one baffle;
   c) a liquid coolant source located above said at least one baffle, wherein said liquid coolant source directs a liquid coolant to contact said at least one baffle; and
   d) an air handler for moving air through said at least one air inlet and past said at least one baffle.

2. A cooling device as described in claim 1 wherein said at least one baffle is present within a housing, and said at least one air inlet is present in a said housing.

3. A cooling device as described in claim 2, wherein said air handler moves said air past said baffle and within said housing, and wherein said air handler forces said air through said exhaust port.

4. A cooling device as described in claim 1, further comprising a deflector, wherein at least a portion of said directional device is positioned above said exhaust port, and wherein air exiting said exhaust port is directed by said deflector.

5. A cooling device as described in claim 1, further comprising a liquid receiving reservoir located below said at least one baffle.

6. A cooling device as described in claim 5, further comprising a pump that communicates with said liquid receiving reservoir and said liquid coolant source.

7. A cooling device comprising:
   (a) a base;
   (b) a housing affixed to said base;
   (c) a plurality of vertically spaced apart baffles located in said housing;
   (d) at least one air inlet positioned in said housing and below said baffles;
   (e) a liquid coolant source located above said baffles, wherein said liquid coolant source directs a liquid coolant to contact said baffles; and
   (f) an air handler for moving air through said at least one air inlet and past said baffles; wherein at least one of said plurality of vertically spaced apart baffles receives a flow of said liquid coolant from at least one other of said plurality of vertically spaced apart baffles that is positioned above said at least one of said plurality of vertically spaced apart baffles.

8. The cooling device as described in claim 7, wherein said plurality of vertically spaced apart baffle are preset within a housing, and said at least one air inlet is present in a housing.

9. The cooling device as described in claim 8, wherein said air handler moves said air past said plurality of vertically spaced apart baffles and within said housing, and wherein said air handler forces said air through an exhaust port.

\* \* \* \* \*